Nov. 13, 1928.

F. TOOHEY

1,691,313

DISTRIBUTING DEVICE

Filed March 27, 1925     8 Sheets-Sheet 1

Nov. 13, 1928.  1,691,313
F. TOOHEY
DISTRIBUTING DEVICE
Filed March 27, 1925   8 Sheets-Sheet 2

Inventor
Frank Toohey
by James R. Hodder
Attorney

Nov. 13, 1928.

F. TOOHEY 1,691,313

DISTRIBUTING DEVICE

Filed March 27, 1925

Inventor
Frank Toohey
by James R Hodder
Attorney

Nov. 13, 1928. 1,691,313
F. TOOHEY
DISTRIBUTING DEVICE
Filed March 27, 1925   8 Sheets-Sheet 5

Nov. 13, 1928.  1,691,313

F. TOOHEY

DISTRIBUTING DEVICE

Filed March 27, 1925   8 Sheets-Sheet 6

Nov. 13, 1928.

F. TOOHEY

1,691,313

DISTRIBUTING DEVICE

Filed March 27, 1925

Patented Nov. 13, 1928.

1,691,313

UNITED STATES PATENT OFFICE.

FRANK TOOHEY, OF SOUTH ACTON, MASSACHUSETTS, ASSIGNOR TO HARDING ENGINEERING COMPANY, OF EAST BOSTON, MASSACHUSETTS, A CORPORATION OF MASSACHUSETTS.

DISTRIBUTING DEVICE.

Application filed March 27, 1925. Serial No. 18,838.

My present invention relates to distributors, and more particularly to an improved distributing device for distributing sheet material in accordance with the weight, thickness, area or other measurable characteristic thereof.

In the manufacture of leather from hides or skins, an important step in the operation is the determination of the weight or thickness of the hide or skin and the sorting thereof into piles according to such weight or thickness. Heretofore the determination of the weight and thickness has been performed manually, an operator picking up a skin or hide and folding it centrally and sliding the thumb and forefingers over the hide, determining in this manner the average thickness thereof. After having its weight or thickness determined, the operator would necessarily walk to a place where the hide was to be placed in a pile and deposit the same therein. In commercial practice, hides or skins adapted for use in the manufacture of shoe uppers have been divided into seven classes, running respectively from "light ladies'" to "heavy men's" and it has been necessary to consign a considerable area of floor space for each operator who determined the weight or thickness of the hides or skins. In prior machines for determining the weight or thickness of hides and skins, several operations are necessary to properly distribute the hides or skins as they come from the weighting or grading machine and the distributing operation therefor has required as much, and in some instances, more floor space than was necessary under the old plan of entirely manual operation of weight and thickness determining. Machines have been devised in which the operations of feeding hides in succession from a plurality of hides arranged in piled or stacked relation on a portable horse or truck to an area measuring device where the area of the hide or skin is stamped thereon and thence feeding the hide or skin through a weighting machine where the average weight or thickness of the hide or skin is determined and stamped thereon, and my present invention is adapted to be associated with such machines to distribute the hides as they are fed from the weighting device.

In carrying out my present invention I provide means adapted to be associated with the grading mechanism to predetermine the setting of a vertically movable elevator provided with a series of superimposed shelves or bins, operating mechanism for moving said elevator being simultaneously controlled therewith. There is further provided means for stopping the vertically movable elevator in its predetermined setting position and in alignment with a reciprocating carriage carrying a movable conveyor which acts as a receiving table onto which the hide or skin is fed from the grading apparatus and from which the hide or skin is automatically discharged into a predetermined shelf or bin in the elevator. Further means is provided for associating the conveyor with the grading apparatus in such manner as to have the conveyor move at the same rate of speed as the speed of the hide or skin passing through the grader. Again, the elevator is carried by its reciprocating frame without relative movement therebetween into a position within the elevator, and means is provided for imparting relative movement to the conveyor and reciprocating frame on the withdrawal of the frame from within the elevator.

The principal object of my invention, therefore, is an improved distributor for sheet material.

Another object of my invention is an improved distributor for distributing sheet material into piles according to the average weight or thickness of the material.

Other objects and novel features of the construction and arrangement of parts comprising my invention will appear as the description of the invention progresses.

In the accompanying drawings illustrating the preferred embodiment of my invention.

Figure 1:
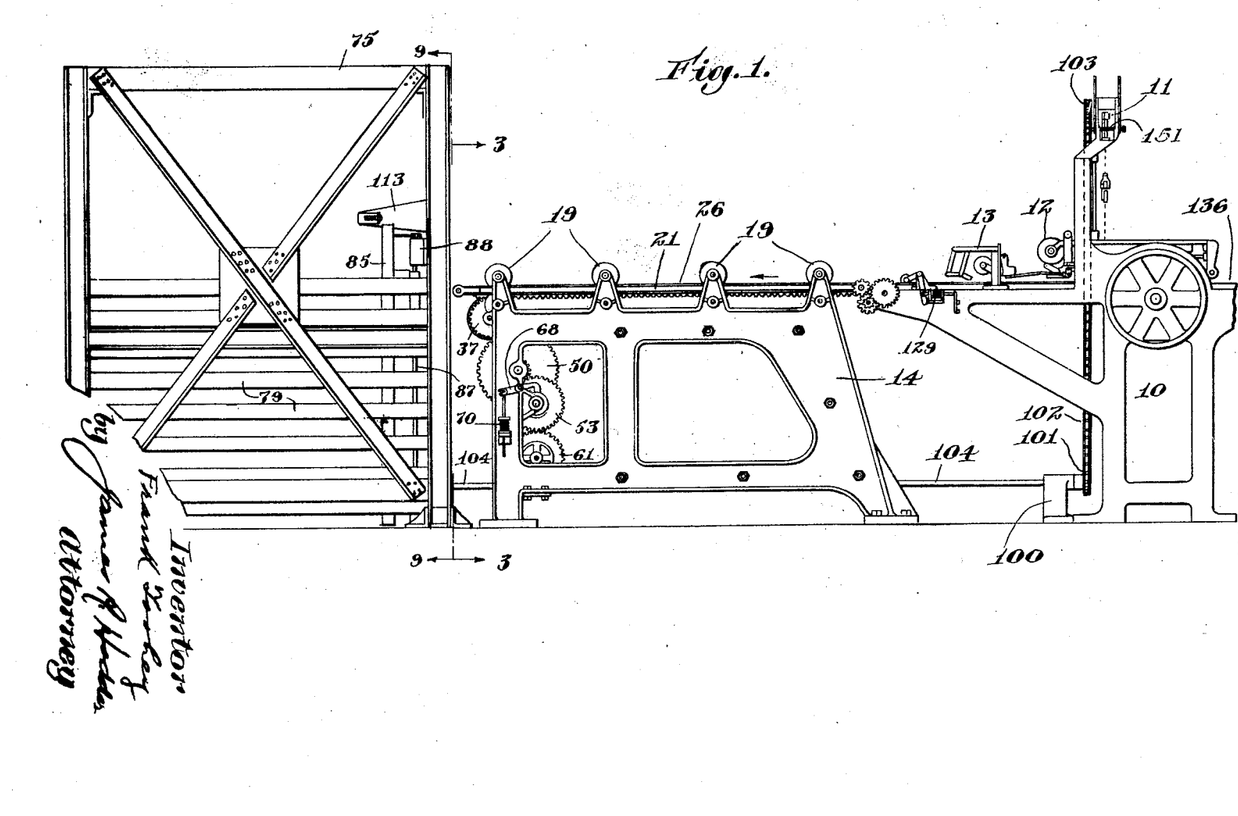
Fig. 1 is a side elevation.
Figure 5:
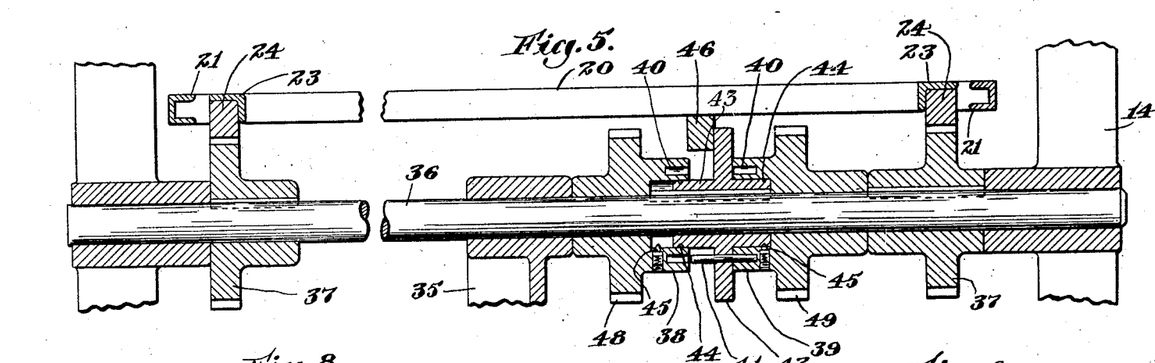
Fig. 5 is a section on the line 5—5 of Fig. 2.
Figure 6:
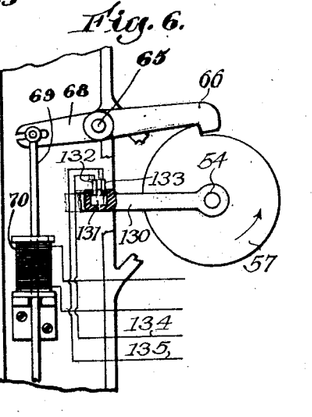
Fig. 6 is an enlarged side elevation of a portion of Fig. 2.
Figure 7:
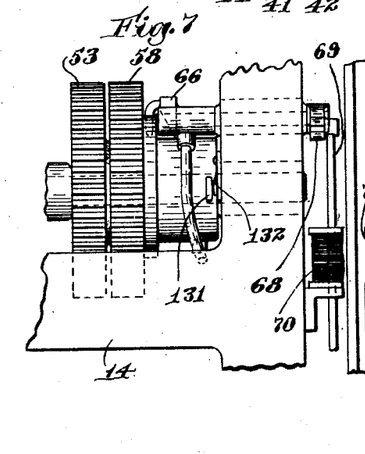
Fig. 7 is an end view of Fig. 6.
Figure 8:
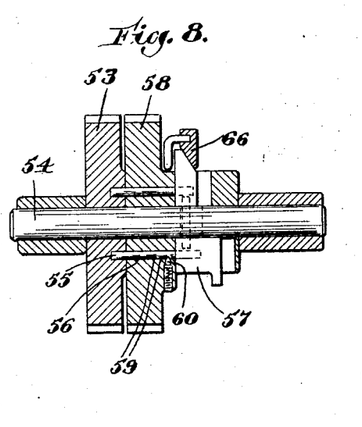
Fig. 8 is a sectional elevation on the line 8—8 of Fig. 6.
Figure 19:
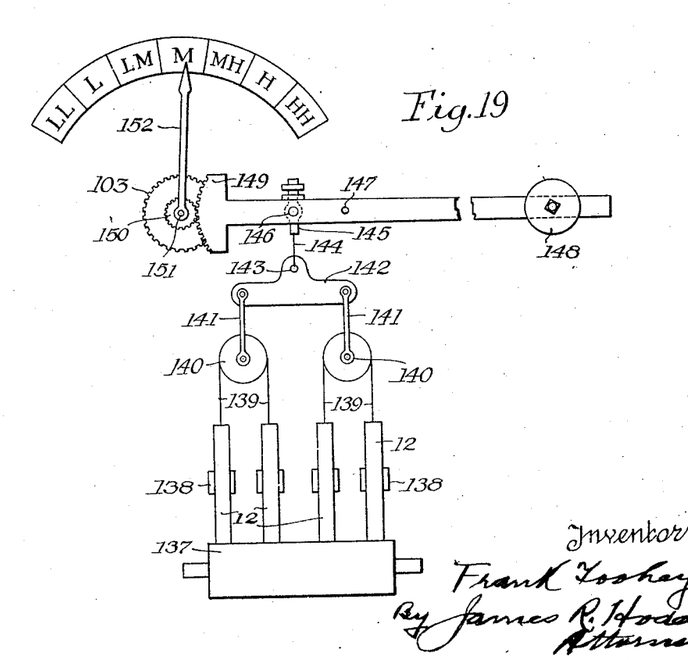
Fig. 19 is a partial front elevation showing the weighting or grading device.

Referring to the drawings, 10 designates, generally, a weighting or grading machine, this device including a mechanism 11 for indicating the thickness or weight of hides or skins or other sheet material fed therethrough and under the rolls 12. The weighting and grading device comprises essentially a feed roll 137 on which rest the measuring rolls 12. Each of the measuring rolls 12 is rotatably mounted in a yoke 138, which yokes are connected to the ends of chains 139. The measuring rolls 12 are arranged in pairs, as shown in Fig. 19, and the yokes of each pair are connected by a chain 139, each of which chains passes over a roll 140. These rolls 140 are rotatably mounted at the lower end of links 141, the upper end of these links being pivotally attached at each end to a substantially horizontal arm 142. To the upper edge of the arm 142 and disposed centrally thereof is a lug 143 to which is attached the lower end of an operating chain 144. The upper end of the operating chain 144 is connected to the lower end of an adjustably mounted bar 145 rotatably mounted in an arm 146. The arm 146 is pivotally attached at 147 to any convenient portion of the frame of the measuring machine, and such arm is provided with an adjustably mounted counterweight 148, at one end, and with a segmental gear quadrant 149 at the other end. The segmental gear quadrant 149 meshes with and drives a pinion 150 secured to a shaft 151 that is rotatably mounted in suitable bearings in the frame of the weighting and grading machine. Also secured to the shaft 151 is an indicating hand or pointer 152 which is associated with a graduated scale 153 to visually indicate the character of the material passing under the rolls 12. Also secured to the shaft 151 is a sprocket 103 which will be hereinafter referred to. Associated with the weighting and grading machine is a printing mechanism indicated generally by 13. As the details of the weighting and grading machine form no part of my invention, they will not be described in detail. The left hand end of the weighting and grading machine shown in Fig. 1 is the delivery end, and adjacent to such delivery end is an apparatus comprised of side frames 14 spaced apart from each other by rods or bars 15 secured in position on the side frame members by nuts 16. At the top of each of the side frame members 14 are upwardly extending portions 17 and in each of said portions are secured stub shafts 18, these shafts being spaced apart from, and parallel to, each other. Rotatably mounted on each of the stub shafts 18 on the inner face of the member 17 are flanged pulleys or rollers 19. A rectangular frame comprised of end members 20, side members 21, and diagonals 22 is mounted for movement between the pairs of rolls 19, the side members 21 being in engagement with the flanged wheels. Secured to the end members 20 and lying parallel to, but spaced apart from, the side members are angle members 23, as clearly shown in Fig. 5, and secured to such angle members and extending downwardly from the rectangular frame are racks 24 which extend substantially throughout the length of the frame. At each end of the frame and in the side members 21 is rotatably mounted a roller 25 and over the rollers are a plurality of parallelly arranged endless belts 26 forming an endless conveyor. On one of the outside endless belts 26 are a plurality of laterally projecting teeth 27 for a purpose to be hereinafter described. At the rear end of the reciprocating frame and secured to one end of the roller 25 is a gear 28 adapted to mesh with, and be driven by, a gear 29 mounted for rotation on a shaft in the rear or delivery end of the frame of the weighting and grading machine 10. Also secured to said last named shaft is a gear 30 adapted to mesh with, and be driven by, a gear 31 secured to a shaft 32 rotatably mounted in the weighting and grading machine 10, and on this shaft 32 is a pulley 33 over which runs a belt 34 leading from the driving mechanism of the weighting and grading machine or from any convenient source of power. When the gears 28 and 29 are in mesh, as above described, movement will be imparted to the upper reach of the conveyor composed of the endless belts 26 in the direction of the arrow shown, for example, in Fig. 2, the speed of the conveyor belt being equal to the speed at which the hides or skins or other sheet material is delivered from the weighting and grading machine 10.

Figure 2:
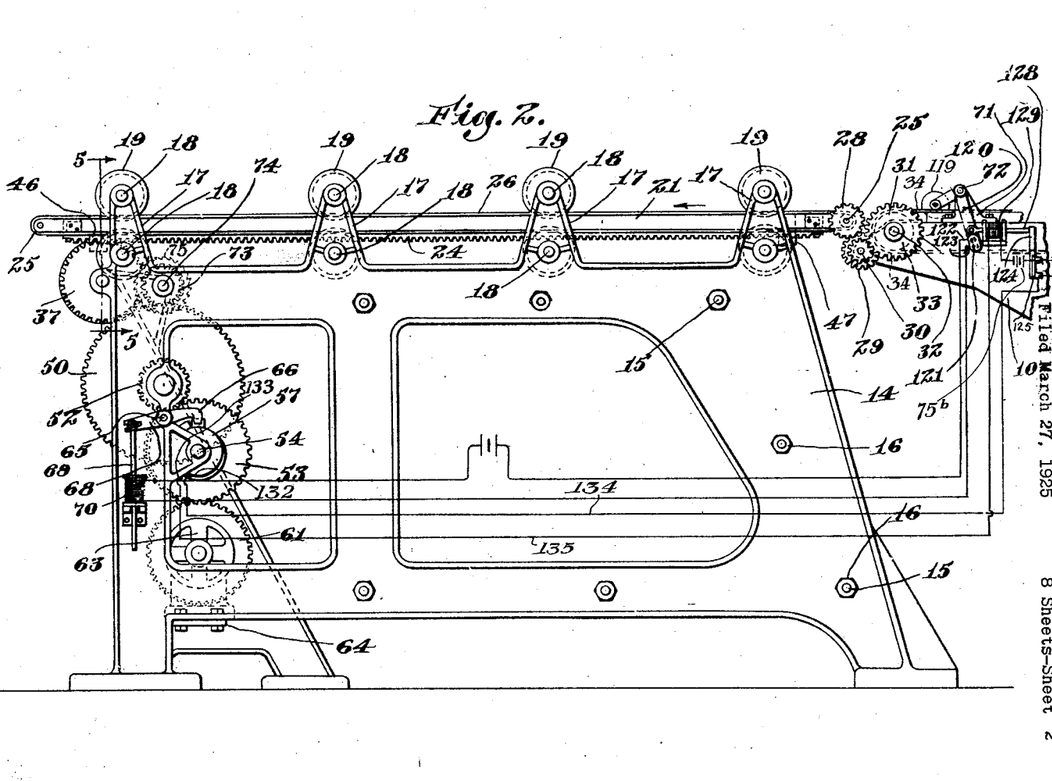
Fig. 2 is an enlarged side elevation of the central portion of Fig. 1.
Figure 3:
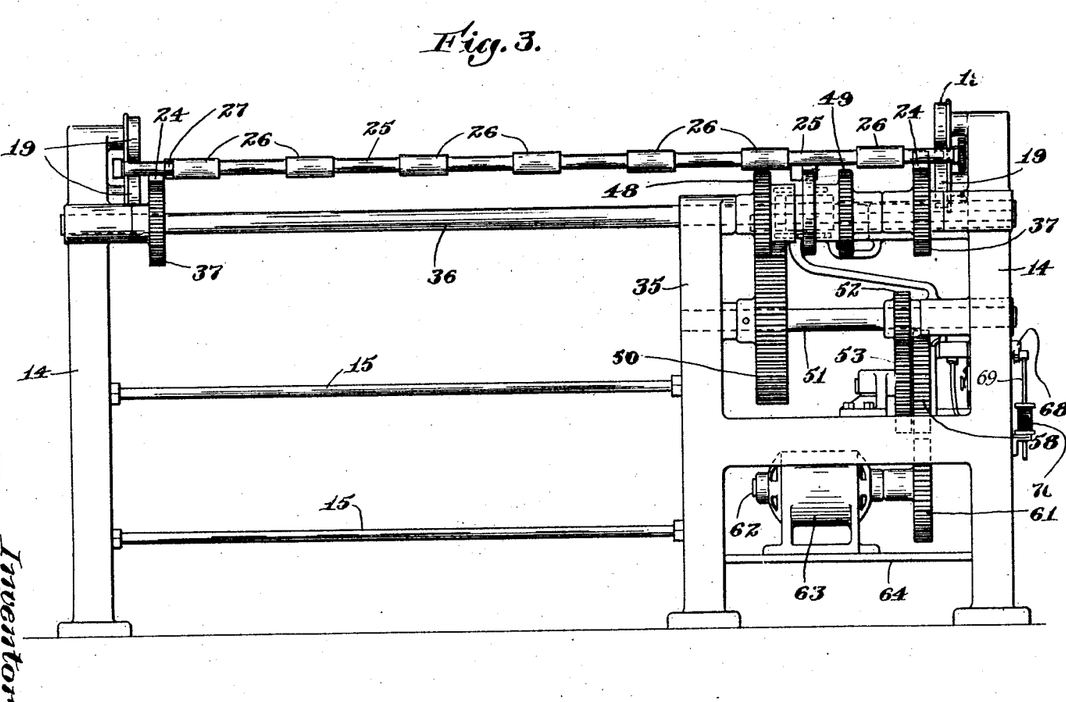
Fig. 3 is an end elevation of Fig. 2, viewed from left to right.

Formed integral with the right hand side frame member 14, as viewed in Figs. 1, 2, and 3, spaced apart and parallel thereto is an auxiliary member 35, and rotatably mounted in the upper end of the auxiliary member 35 and the upper member of the frame members 14 is a shaft 36 lying beneath and parallel to the roller 25. Secured to the shaft 36 adjacent to each side of the frame members 14 are gears 37 equal in pitch and diameter and also equal in pitch to the pitch of the racks 24. These gears mesh with the racks 24 and are operated under suitable conditions and move the conveyor frame back and forth over the top of the structure above described. Between the right hand side frame member 14 and the auxiliary member 35 and rotatably mounted on the shaft 36 are clutch members 38 and 39 respectively, the opposing faces of these clutch members being provided with longitudinally extending holes 40, and adapted to receive either end of a clutch pin 41 carried by a clutch member 42 that is slidable on, but rotatable with, the shaft 36. The slidable clutch member 42 has its hub portion 43 provided adjacent to each end with circumferential grooves 44 adapted to be engaged by spring pressed plungers 45 mounted in the clutch members 38 and 39, and the engagement of the circumferential grooves 44 by the spring pressed plungers 45 normally maintains the clutch member 42 in engagement with either the clutch member 38 or the clutch member 39. Carried by the front and rear cross bars 20 and downwardly depending therefrom are clutch operating devices 46 and 47 respectively, these clutch operating devices being moved alternately into engagement with the sliding clutch member 42 to move the same in such manner as to bring the same into engagement alternately with the clutch members 38 and 39.

Figure 20:
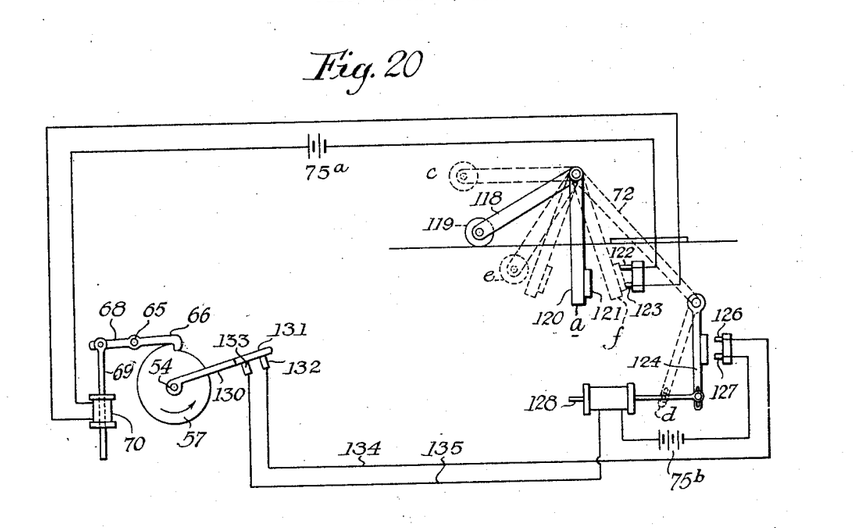
Fig. 20 is a diagramatic showing of the circuit controlling devices.

Formed on the clutch members 38 and 39 are gears 48 respectively, and these gears are equal in pitch and diameter. The gear 48 meshes with, and is driven by, the gear 50 secured to a shaft 51 mounted in suitable bearings in the right hand side frame member 14 and the member 35. Secured to the shaft 51 is a gear 52 which meshes with, and is driven by, a gear 53, rotatably mounted on a shaft 54 that is, in turn, rotatably mounted in suitable bearings. One face of the gear 53 is provided with a plurality of circularly arranged holes 55 in which fit pins 56 carried by a sliding clutch member 57 forming part of a one revolution clutch. The pins 56 slide through a gear 58 equal in diameter and pitch to the gear 53, and one of the pins 56 is provided with grooves or notches 59 in which fits a spring pressed plunger 60 carried by the gear 58, the plunger 60 and grooves 59 cooperating to hold the pins 56 either in or out of engagement with the gear 53 under normal conditions. The gear 58 meshes with, and is driven by, a gear 61 mounted on, and driven by, the driving shaft 62 of a motor 63 that is mounted on a platform 64. Secured to the outer end of the shaft 65 is an arm 68 to which is pivotally attached the plunger armature 69 of a solenoid 70. Mounted on the side frame members of the weighting and grading machine 10 and at the rear end thereof are bearing brackets 71 in which is rotatably mounted a shaft 72. Secured to said shaft between the bearings 71 is a bell crank arm 118 on which is the rotatably mounted roller 119, the plane in which lies the top surface of the weighting and grading machine being tangent to the roller 119. Secured to one end of the shaft 72 is an arm 120 which, when the roller 119 is in the normal position above indicated, occupies the position indicated by $a$ in the drawings. The arm 120 carries, adjacent to its outer free end, a contact plate 121 adapted to be brought into engagement with contact pins or points 122 and 123 simultaneously, which contact pins or points are connected by suitable conductors to a source of power and to the solenoid 70. Also secured to the shaft 72, and preferably at the end remote from the arm 120, is another arm 124, which arm is provided, intermediate its ends, with a contact plate 125 adapted to engage with contacts 126 and 127 simultaneously. Pivotally attached to the outer free end of the arm 124 is a plunger armature 128 of a solenoid 129 that is secured to the frame of the weighting and grading machine in any desired manner. When the roller 119 is in a neutral position, as above referred to, the arm 124 will hold the contact plate 125 out of engagement with the contacts 126 and 127. Secured to the shaft 54 is a radially extending arm 130 provided at its outer free end with a contact plate 131 that is insulated from the main portion of the arm. Mounted adjacent to the contact plate 131 are contacts 132 and 133 respectively. The contact 132 is connected by conductor 134 to the contact 127, while the contact 133 is connected to one end of the solenoid 129 by conductor 135. The other end of the solenoid 129 is connected to the contact 126 through any suitable source of power as the battery 75$^b$. The position of the shaft 54 and associated clutch operating device 57 is indicated in Fig. 2 of the drawings, and in this position it will be noted that the contact plate 131 is adjacent to the ends of the contacts 132 and 133, though in engagement therewith. Also it will be noted from an inspection of Fig. 20 that the contact plate 121 is maintained out of engagement with the contacts 122 and 123 because of the fact that the roller 119 is in neutral position and, further, that the contact plate 125 is out of engagement with the contacts 126 and 127. Under these conditions it is obvious that, if a hide or skin, as 136, is moved to the left of Figs. 1 and 2, such hide or skin, engaging with the roller 119, will move said roller upward, or into the position indicated by the letter c. In this position, also, the member 124 will move to the position indicated by the letter d, or move the contact plate 125 further away from the contacts 126 and 127. If, now, the skin has passed beyond the roller 119, such roller will drop from the position indicated by c into the position indicated by e and the arm 120 will move into the position indicated by f, bringing the contact plate 121 into engagement with the contacts 122 and 123, completing in this manner an energizing circuit through the source of power $75^a$ for the solenoid 70, which thereupon forces the plunger armature 69 downwardly and allows rotation of the shaft 65, bringing the member 66 into engagement with the clutch member 57. The one way clutch is, therefore, operated and begins to rotate for one revolution in the direction of the arrow shown. Contact plate 121 engages contacts 122 and 123 before the contact plate 125 engages contacts 126 and 127. Immediately after the shaft 54 starts to rotate, the radially extending arm 130 will move the contact plate 131 off the contacts 132 and 133 so that, when the contact plate 125 is moved into engagement with the contacts 126 and 127, no circuit will be completed at this time for the solenoid 129. The shaft 54, completing its revolution, will, just before the revolution is completed, move the contact plate 131 into engagement with the contacts 132 and 133, thus completing the circuit through the source of power $75^b$ for the solenoid 129 which will rotate the shaft 72 so as to bring the roller 119 back into the neutral or normal position, as above referred to. This sequence of operations will take place indefinitely as the hides 136 are fed under the roller 119. The gear 50 meshes with, and drives, an idler gear 73 secured to a countershaft 74 that is rotatably mounted in suitable bearings in the right hand side of the frame member 14 and the member 35. Also secured to the countershaft 74 is a gear 75 that meshes with a gear 49 formed on the clutch member 39. The train of gears above described is so arranged and proportioned that, when the clutch member 66 is moved out of engagement with the member 57 by the operating rod 69, the gear 53 will be engaged by the pins 56 and through the train of gearing will rotate the gear 49 in an anticlockwise direction as viewed in Figs. 1 and 3, it being assumed that, prior to this time and when the frame 21 was moved into the position shown in Figs. 1 and 2, the clutch operating member 46 carried thereby had moved the clutch member 42 into engagement with the clutch member 39. Therefore, under these conditions, the frame 21 will be moved to the left, as shown in Figs. 1 and 2. The train of gears is also proportioned so that one revolution of the shaft 54 will move the frame 21 its full travel to the left, as shown in Figs. 1 and 2, at which time the clutch operating member 47 carried by the rear end members 20 will have engaged the clutch member 42 and moved the same out of engagement with the clutch member 39 and into engagement with the clutch member 38, thereby causing the shaft 36 to be rotated in a clockwise direction and moving the frame 21 back into its normal position, or the position shown in Figs. 1 and 2.

Figure 4:
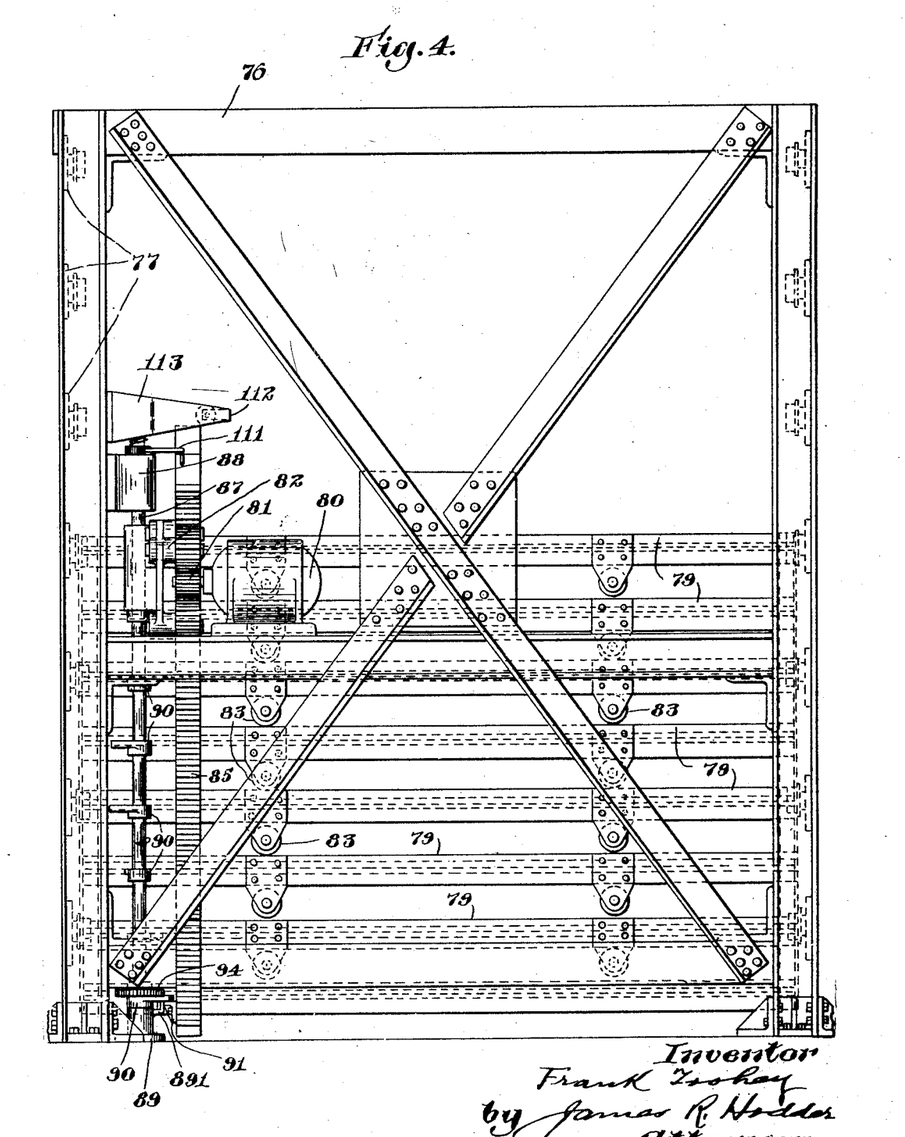
Fig. 4 is a rear elevation of Fig. 1.
Figure 9:
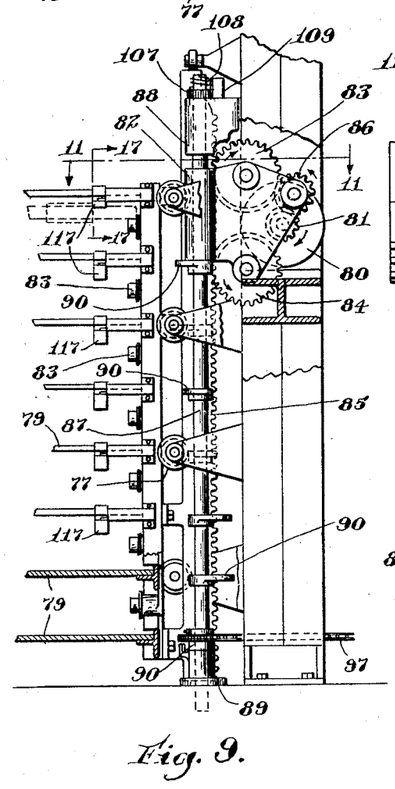
Fig. 9 is an elevation looking to the right in Fig. 1 and at the right hand side thereof.
Figure 11:
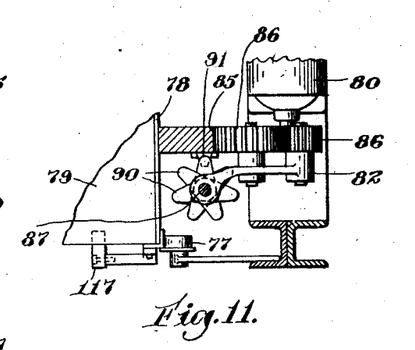
Fig. 11 is a sectional plan view on the line 11—11 of Fig. 9.

At the left hand end of the mechanism as shown in Figs. 1 and 2, carried by the frame members 14 is a vertically arranged rectangular frame 76, as shown in Figs. 1 and 4. At each corner of the rectangular frame 76 are vertically arranged anti-friction rollers 77 and adapted to move in a vertical plane on such rollers is a second rectangular frame 78 carrying a plurality of parallelly arranged superimposed shelves 79, these shelves being spaced apart from each other any appropriate distance. Mounted on the rectangular frame 76 is a motor 80 provided on its driving shaft with a pinion 81. Carried by the rectangular frame 78 is a bracket 82 having rotatably mounted thereon and spaced apart from each other gears 83 and 84 respectively, which are equal in pitch and diameter and which mesh with the vertically arranged rack 85 secured to the rectangular frame 78. The gears 83 and 84 rotate normally in the direction of the arrow shown in Fig. 9, and meshing with the gear 83 is a pinion 86, also rotatably mounted in the bracket 82, and which gear is adapted to engage with the pinion 81 on the motor 80, which motor rotates in the direction of the arrow shown in Fig. 9. The bracket 82 is slidably mounted on a shaft 87 that is rotatably mounted in bearings 88 and 89 secured to the rectangular frame 76. The shaft 87 is located at one side of the frame 78 and is provided along its length with a plurality of adjustable radially extending arms 90, the bracket 82, as will be seen from an inspection of Fig. 9, having a vertical movement with the shaft 87, the amount of movement of the bracket and shaft being limited by the bearing 88. Carried by the frame 78 is a lug 91 which, as will be seen in Fig. 11, has a path of movement in a line with the predetermined radially projecting arms 90 carried by the shaft 87, and the continued upward movement of rectangular frame 78, after having been brought into engagement with the selected one of the arms 90, will move the bracket 82 upward, as viewed in Fig. 11, moving the pinion 86 out of engagement with the pinion 81 of the motor 80 and moving the gear 84 in engagement with said motor, this movement, however, only taking place after a predetermined length of time, or not until after a desired sequence of operations has taken place.

Figures 10, 13, 14, 15, 16:
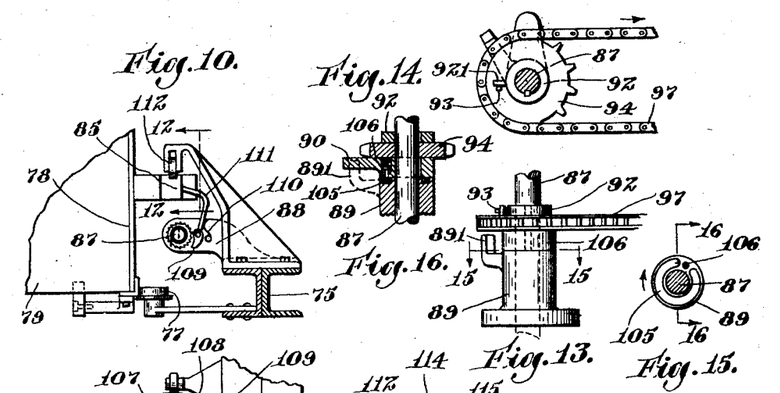
Fig. 10 is a plan view of Fig. 9.
Fig. 13 is an enlarged view of a portion of Fig. 9.
Fig. 14 is a side elevation of Fig. 13.
Fig. 15 is a sectional elevation on the line 15—15 of Fig. 13.
Fig. 16 is a sectional elevation on the line 16—16 of Fig. 15.
Figure 12:
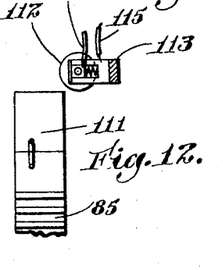
Fig. 12 is a detail.
Figure 17:
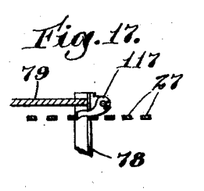
Fig. 17 is a detail.
Figure 18:
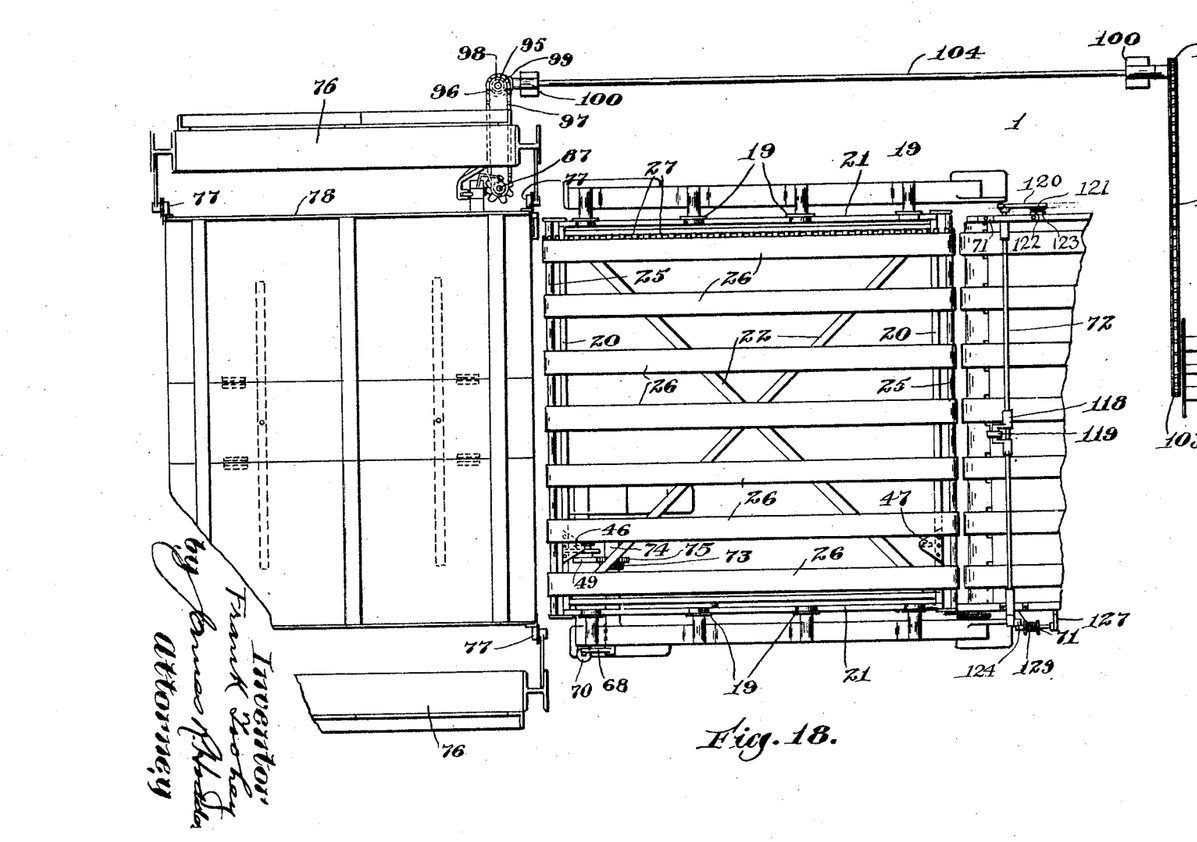
Fig. 18 is a plan view.

Secured to the shaft 87 adjacent to the lower end thereof and above the lower end of the radially extending arms 90 is a collar 92 from which projects a radially extending pin 921. Rotatably mounted on the shaft 87 between the collar 92 and the lower radially extending arm 90 is a sprocket 94, and secured to, and extending upwardly from, such sprocket is a pin 93. Secured to the bearing 89 is an outwardly and upwardly extending arm 891 which is adapted to be engaged by the lowermost radially extending arm 90 when such arm, and therefore the shaft 87, is in the normal or zero position. Also, when the collar 92, shaft 87, and sprocket 94 are in the normal or zero position, the radially extending pin 921 of the collar 92 is in engagement with the upwardly extending pin 93 on said sprocket. Mounted on the support for the entire apparatus or in any other manner desired, is a vertically mounted shaft 95 having secured thereto a sprocket 96, and over the sprockets 96 and 94 runs a chain 97. Secured to the shaft 95 is a bevel pinion 98 which meshes with, and is driven by, a bevel pinion 99 secured to one end of a shaft 104 that is rotatably mounted in bearings 100, this shaft extending forwardly and terminating at a point adjacent to the weighting and grading machine 10. Secured to the end of the shaft 104 adjacent to the weighting and grading machine 10 is a sprocket 101 over which passes a chain 102 leading from, and driven by, a sprocket 103 controlled by the indicating mechanism associated with the weighting and grading machine. The amount of rotation imparted to the sprocket 103 by a sheet of leather or other material passing through the grading machine will determine the amount of rotation imparted to the shaft 87 through the pins 921 and 93 respectively, and will thus determine which of the radially extending arms 90 on the shaft 87 will be brought into the path of movement of the bracket 91 carried by the rectangular frame 78. Secured to the shaft 87 adjacent to the lower end thereof carried by the lower bearing 89 and insulated therefrom is a commutator plate 105. Secured to the lower radially extending arm 90 is a spring pressed contact pin 106 which is insulated from the arm 90 and is adapted to be moved into and out of engagement with the commutator plate 105 on rotation of the shaft 87. As will be seen from an inspection of Fig. 15, the commutator plate 105 does not extend entirely around the upper surface of the bearing 80, and the normal position of the pin 106 is as shown in such figure. The contact pin 106 and commutator plate 105 constitute break points in the energizing circuit for the motor 80, and it will be obvious that, immediately after the shaft 87 has been started in rotation by the chain 97, the circuit for the motor 80 will be closed and the rectangular frame 78 will begin its upward movement. The setting of the radial arms 90 and the starting of the motor take place practically simultaneously, but the upward travel of the rectangular frame 78 is so proportioned that practically an entire revolution of the shaft 87 may take place before the bracket 91 carried by the frame 78 reaches the position occupied by the lowermost radially extending arm 90. As the sprocket 103, associated with the indicating mechanism 11 of the weighting and grading machine 10, returns to normal position simultaneously with the return to normal of the indicating device, provision has been made for allowing independent movement of the sprocket 94 and shaft 89 to their normal or zero position, and this means comprises a ratchet 107 secured to the shaft 87 adjacent to the top end thereof and above the bearing 88, and cooperating with this ratchet is a coil spring 108, one end of which is fastened to the ratchet 107 and the other to an extension of the bracket 88. Associated with the ratchet 107 is a pawl 109, this pawl being pivotally mounted on the bearing 88 and normally engaged by a spring 110 that maintains it out of engagement with the ratchet 107. The spring 108 is so wound and arranged with respect to the shaft 87 that rotation of the shaft 87 in a clockwise direction tensions the spring 108 so that this spring tends to rotate the shaft 87 in an anti-clockwise direction and this anti-clockwise movement is limited by the engagement of the lowermost arm 90 with the stop or bracket 891. The pawl 109 has formed integral therewith an arm 111 which extends downwardly and in the path of movement of the rack 85 carried by the frame 78. The arm 111 and rack 85 are so arranged relative to each other that the shaft 87 need only be slightly raised before engaging with the arm 111 and therefore move the pawl 109 into engagement with the ratchet 107 and thus maintaining the shaft 87 and arms 90 carried thereby in the position to which it may have been moved by the sprocket 94. When the shaft 87 has been moved downwardly and just before it reaches its normal position, and rack 85 will move out of engagement with the arm 111 and the spring 110 will force the pawl 109 out of engagement with the ratchet 107 and the spring 108, therefore, will rotate the shaft 87 in an anti-clockwise direction until the lowermost arm 90 engages with the stop 891. It is obvious, also, that, when the bracket 91 on the frame 78 has engaged with the predetermined radially extending arm 90 and moved the shaft 87 and associated parts upward, the contact pin 106 will move out of engagement with the commutator segment 105, thus breaking the energizing circuit for the motor 80 and stopping the rotation of its shaft so that, when the gear 84 is brought into mesh with the pinion 81, no downward movement of the frame 78 will take place until the unloading operation of the conveyor 26 has been completed. The hide or skin or other material of sheet metal, having passed the indicating mechanism of the weighting and grading device, will also pass under the printing mechanism 13 where the average weight or thickness of the hide will be stamped thereon, and the gears 28 and 29, being in mesh, the conveyor 26 will be moving in the direction of the arrow shown in Figs. 1 and 2. As the hide or skin moves onto the conveyor 26 under the roller 119 carried by the bell crank 118, the rod 119 will be lowered, rotating the shaft 72 and causing, through the instrumentalities above described, a lifting up of the clutch operating device 66 and connecting the gear 53 with the shaft 54 for one complete revolution of such shaft. When the rectangular frame 78 moves upwardly, the rack member 85 moves into engagement with the roller 112 in a bracket 113 secured to the rectangular frame 75. Referring to Fig. 12, it will be seen that the inward movement of the roller 112 will cause the engagement of a contact 114 carried by the bearing thereof with the contact 115 carried on the bracket 113. This closes a break point in a second energizing circuit for the motor 80. The motor 80 is not, however, energized at this time as such energizing circuit has in it a pair of break points 116 and 117 controlled by the reciprocating frame carrying the conveyor 26. The operation of the clutch 57 by the member 66 allows power to be transmitted through the train of gears above described to the gear 49, whereupon the shaft 36 is rotated in an anti-clockwise direction, and the gears 37, meshing with the rack 24, moves the rectangular frame to the left, as shown in Figs. 1 and 2, and moving said frame and the hide or skin thereon above the predetermined shelf 79 in the rectangular frame 78. As above described, the train of gears for reciprocating the rectangular frame is so proportioned that the rectangular frame is moved to its extreme left position shown in Figs. 1 and 2 during the half revolution of the shaft 54. Mounted on the rectangular frame 78 below each of the shelves 79, and adjacent to the portion of the machine lying in the line of movement of the belt 26 carrying the laterally projecting teeth 27 is a pivotally mounted pawl 117 which is adapted, as will be seen from an inspection of Fig. 17, to allow the laterally projecting teeth 27 to ride freely under the same during the movement of the rectangular frame to the left in Figs. 1 and 2, but which pawl 117 will engage with one of the laterally projecting teeth 27 when the rectangular frame carrying the conveyor is moved to the right in said Figs. 1 and 2. Therefore, in the movement to the right of the rectangular frame carrying the conveyor, such conveyor will be held stationary by the engagment of the pawl 117 with one of the laterally projecting teeth 27 and relative movement will be imparted to the conveyor on the movement to the right of such rectangular frame, thereby depositing the hide or skin that rested on the conveyor onto the next lower shelf.

The operation of my improved apparatus is as follows, it being assumed that the parts have been constructed and arranged as above described and that the hides or skins 136 are being fed through the weighting and grading machine 10 from right to left as viewed in Fig. 1. The average weight or thickness of the hide or skin as it passed under the rolls 12 is indicated on the mechanism 11, and associated with the rotating shaft 151 of such indicating mechanism is the sprocket 103 which naturally rotates in synchronism with the shaft 151 and imparts a predetermined movement to the vertical shaft 87, which shaft positions one or the other of the vertically movable members 91 attached to the frame 78. As soon as the shaft 87 starts to rotate, the contact 106 moves into engagement with the commutator segment 105, closing an energizing circuit for the motor 80 which, rotating, transmits through the gears 86 and 83 power to the rack 85, causing an upward movement of the rectangular frame 78 and this upward movement will continue until the positioned radially extending arm 90 is engaged by the bracket 91 which will move the shaft 87 upward until the bracket 82 engages with the under face of the bearing 88. This upward movement of the shaft 87 moved the gear 86 out of engagement with the gear 81, thus disconnecting the motor 80 from such gear, and as the shaft 87 moved upward, the contact pin 106 moved off the commutator segment 105, breaking the energizing circuit for the motor 80. Also, the gear 84 moved into mesh with the gear 81 on the driving shaft of the motor. The rectangular frame 78 is now brought to rest with the proper shelf thereon in position to allow the rectangular frame carrying the conveyor 26 to move between it and the adjacent shelf. When the shaft 87 moved upward, the side of the rack member 85 engaged with the roller 112 on the member 113, moving the contact 114 into engagement with the contact 115 and closing a break point in a second energizing circuit for the motor 80.

The weighting and grading machine being in operation, the train of gears 33, 30, and 29 are rotated by the belt 34 and the gear 28 carried at the end of the rectangular frame, on which is mounted the conveyor 26, is rotating so as to move the upper reach of the conveyor 26 in the direction of the arrow shown in Figs. 1 and 2 and at the same speed as the hide or skin 136 is moving through the weighting and grading machine. As the rear end of the hide 136 passes under the printing mechanism 13, the average weight or thickness indicated on the mechanism 11 is stamped onto the hide, it being understood, of course, that the printing mechanism is associated with the indicating mechanism in any desired manner. The hide 136 in its movement to the left now passes under the roller 119 which drops from the position indicated by c into the position indicated by e in Fig. 20, bringing the contact plate 121 on the arm 120 into engagement with the contacts 122 and 123 and energizing the solenoid 70 which forces the plunger armature 69 upward, as viewed in such figure, and rotating the shaft 65 so as to bring the member 66 into engagement with the clutch device 57. The motor 63 being in operation and its shaft rotating constantly, the shaft 54 is connected thereto and rotates in the direction of the arrow shown in Fig. 2 and will continue its rotation through a single full revolution. Immediately the shaft 54 starts to rotate, the radially extending arm 130, carrying the contact plate 131, moves off the contacts 132 and 133 an instant before the contact plate 125 is moved into engagement with the contacts 126 and 127 so that, although break points in the circuit for the solenoid 129 are closed at the contacts 126 and 127, such solenoid will not be energized because of the breaking of the circuit at contacts 132 and 133. The clutch 57 having been operated and the clutch member 42 being in engagement with the clutch member 39, motion is imparted to the shaft 36 that carries the gears 37, such gears rotating in the direction of the arrow shown in Fig. 2, and meshing with the rack 24, moves the rectangular frame carrying the conveyor 26 to the left, as shown in Figs. 1 and 2, thus placing the conveyor between adjacent shelves 79 and in position with the desired shelf to deposit a hide or skin thereon. During this movement to the left of the conveyor, the laterally extending bars 27 pass freely by the pawl 117. As the conveyor reaches its extreme outward position, the clutch operating device 47 engages with the clutch member 42 and moves the same out of engagement with the clutch member 39 and into engagement with the clutch member 38. The clutch member 38 being formed integral with the gear 48, and this gear rotating in the reverse direction to the gear 49 formed on the clutch member 39, power is being delivered from the motor 63 to the shaft 36, thus rotating the gears 37 in the reverse direction to that indicated by the arrow in Fig. 2. The rectangular frame now moves to the right, as shown in Figs. 1 and 2, and on the starting of the rectangular frame to the right, one of the laterally extending bars 27 is engaged by the pawl 117 and the conveyor 26 is prevented from bodily movement to the right, although it is obvious that a relative movement between the conveyor 26 and its carrying rectangular frame takes place, this movement resulting in the depositing of the hide or skin on the predetermined shelf 79. When the rectangular frame reaches its normal or initial position, as shown in Figs. 1 and 2, the gear 28 is again brought into mesh with the gear 29 and movement imparted to the conveyor 26 as above described. Further, the bringing of the conveyor and rectangular frame to the initial position causes the engagement of the contact 116 with the contact 117, closing the second break in the second energizing circuit for the motor 80, the first break point having been closed at the contacts 114 and 115 when the shaft 87 reached its uppermost position. This completing of the second energizing circuit for the motor 80 causes it to start in motion and the gear 84, being at this time in engagement with the motor, a downward movement will continue until the rectangular frame 78 has reached its lowermost position. As the shaft 87 started on its downward movement, the arm 111 moved off the top of the rack member 85 and the spring 110 forces the ratchet 109 out of engagement with the ratchet 107, whereupon the spring 108 rotated the shaft 87 back to its normal position, or until the lower radially extending arm 90 engaged with the stop arm 891 so that, when the rectangular frame 78 has reached its lowermost position, the contact 106 carried thereby is brought to rest out of engagement with the commutator segment 105. As the shaft 54 approaches its full revolution, the contact plate 131 carried by the arm 130 engages with the contacts 132 and 133, completing the circuit for the solenoid 129 which, being energized, its plunger armature 128 moves the arm 124 in the direction to rotate the shaft 72 and bring the roller 119 into a position intermediate the positions indicated by c and e in Fig. 20. This movement of the arm 124 moves the contact plate 121 out of engagement with the contacts 122 and 123 and breaking the energizing circuit for the solenoid 70, allowing the clutch operating member 66 to move out of operative engagement with the clutch member 57. The above sequence of operations is repeated indefinitely during the operation of the machine.

I have, in this specification, described my invention as being particularly applicable to the sorting of hides or skins into groups according to the weight or thickness thereof. This, however, has been merely for illustrative purposes only and it is obvious that my invention is applicable to the sorting of any sheet material into predetermined groups in accordance with the area thereof or with any other characteristic of the sheet material. My invention, therefore, is applicable for conjoint use with an area measuring machine or a machine which determines the degree of hardness or softness of the material, such machines either being equipped with indicating mechanism for indicating the area or the degree of hardness of the material, for example, or which machines may be equipped with such indicating mechanisms, the setting of such indicating mechanisms controlling the setting of the elements of the present invention.

While I have, therefore, necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. An improved distributing device for sheet material, comprising a vertically movable rack having a plurality of shelves, means for positioning said shelves in accordance with the thickness of the sheet material, and means for automatically depositing the sheet material thereon.

2. An improved distributing device for hides or skins, comprising a rack having a plurality of shelves adapted for the reception of hides or skins of differing thickness, a conveyor, means for depositing on said conveyor hides or skins regardless of the thickness thereof, means associated with the rack for positioning any shelf thereof at the delivery end of the conveyor in accordance with the average thickness as determined by the hide depositing means, and means for automatically operating the conveyor to deposit a hide or skin on the shelves.

3. An improved hide distributing device having, in combination, a means for determining the average thickness of a hide or skin, a vertically movable rack having a plurality of shelves thereon, means for positioning said rack, controlling means therefor operable by the average thickness determining means, a conveyor for receiving said hides or skins, and means for operating said conveyor to deposit a hide or skin on a predetermined shelf of the rack.

4. In a distributing device, the combination of a rack, a plurality of shelves therein and arranged in vertical relation, means for moving said rack vertically, and means for predetermining the vertical movement of the rack.

5. In a distributing device, the combination of a vertically movable rack, a plurality of shelves therein and vertically arranged with respect to each other, a shaft, a plurality of radially extending arms thereon, means for rotating said shaft to any desired angle, means for moving said rack vertically, and means on said rack for engaging with a predetermined one of the radially extending arms for limiting and predetermining the vertical movement of the rack.

6. An improved hide distributing device for distributing hides from a plurality of hides and arranging the same in groups according to the average thickness of the hide, comprising means for determining the average thickness of a plurality of hides in succession, a vertically movable rack having a plurality of shelves thereon arranged vertically, a conveyor adapted for reciprocation into and out of the rack between the shelves, means associated with said rack for positioning any desired shelf in alignment with the reciprocating conveyor, operating means between the average thickness indicating means and the vertically movable rack for determining the positioning of a shelf on said rack at the delivery end of the conveyor in accordance with the average thickness of the hide passing through the indicating means, means controlled by the hide or skin after its passage through the indicating means for controlling the reciprocating movement of the conveyor, and means for automatically moving said conveyor out of engagement with the rack.

7. An improved distributing device for sheet material comprising a plurality of superimposed shelves, and a single horizontally movable conveying means for automatically depositing on said shelves the sheet material arranged in groups in accordance with the predetermining characteristics thereof.

8. In a distributing device, the combination of a conveyor, means for moving the same in a horizontal plane, a vertically movable rack, a plurality of parallelly arranged shelves thereon, means for moving said rack vertically to bring a predetermined shelf into horizontal alignment with the conveyor, and means for predetermining the vertical movement of the rack.

9. In a distributing device, the combination of means for indicating the character of sheet material, a distributing device, controlling apparatus associated with said means for operating the distributing device in accordance with the character of the material as determined by said means, and a conveyor operable to convey material from the character indicating device to the distributing device.

10. An improved distributing device for sorting sheet material, comprising a movable carrier having sheet receiving means corresponding to predeterminable characteristics of each sheet, in combination with mechanism to determine such characteristics of each sheet and to actuate said carrier into receiving position corresponding thereto.

11. An improved distributing device for sorting sheet material, comprising a movable carrier having sheet receiving means corresponding to predeterminable characteristics of each sheet, in combination with mechanism to determine such characteristics of each sheet and to actuate said carrier into receiving position corresponding thereto during the continuous operation of the machine.

12. An improved distributing device for sorting sheet material, comprising a movable carrier having sheet receiving means corresponding to predeterminable characteristics of each sheet, in combination with mechanism to determine such characteristics of each sheet and to actuate said carrier into receiving position corresponding thereto during the continuous feeding of successive sheets to be sorted.

13. An improved distributing device for sorting sheet material, comprising a vertically movable carrier having sheet receiving means corresponding to predeterminable characteristics of each sheet, in combination with mechanism to determine such characteristics of each sheet and to actuate said carrier into receiving position corresponding thereto.

14. In a distributing device, horizontally movable means for feeding sheet material, a vertically movable means to receive and hold said material so fed, and means for producing relative movement between the material feeding and the material receiving means proportioned to varying characteristics of the material being operated on.

15. In a distributing device, means for feeding sheet material, a vertically movable carrier to receive and hold said material so fed, and means for producing relative movement between the material feeding and the material receiving means determined by the varying characteristics of the material being operated on.

16. In a distributing device, means for determining the characteristics of sheet material, a movable carrier provided with means for receiving said sheet material, means for positioning the carrier in accordance with the characteristics of the material as determined by the first said means, and a conveying device associated with the first said means and said carrier.

17. An improved distributing device to sort sheet material into groups according to the characteristics of such material, comprising a movable carrier having sheet receiving means corresponding to the predeterminable characteristics of each sheet, means for predetermining said characteristics, mechanism associated therewith for positioning the movable carrier in accordance with the characteristics of each sheet, and a conveying means extending between the carrier and the determining means.

In testimony whereof, I have signed my name to this specification.

FRANK TOOHEY.